Dec. 17, 1946.　　　　　S. GODET　　　　　2,412,612
DIRECTIVE RADIO SYSTEM
Filed Oct. 8, 1941　　　　3 Sheets-Sheet 2

Fig. 4a.
Voltage between slip rings.

Fig. 4b.
Voltage between train brushes.

Fig. 4c.
Voltage between elevation brushes.

Target below axis of rotation.

Target right of axis of rotation.

Target above axis of rotation.

Target left of axis of rotation.

Fig. 8.

Inventor:
Sidney Godet,
by Harry E. Dunham
His Attorney.

Patented Dec. 17, 1946

2,412,612

UNITED STATES PATENT OFFICE 2,412,612

DIRECTIVE RADIO SYSTEM

Sidney Godet, Schenectady, N. Y., assignor to General Electric Company, a corporation of New York Application October 8, 1941, Serial No. 414,126

14 Claims. (Cl. 250—11)

My invention relates to directive radio systems and in particular to means for controlling automatically the direction of orientation of said systems.

It has for one of its objects to provide means responsive to received waves to control the direction of orientation of the receiving system in a plurality of planes to maintain said direction in correspondence with the direction of propagation of the received waves.

A further object of my invention is to provide means for automatically maintaining a directive radiating system directed at a moving object on which waves radiated by said system impinge.

A further object of my invention is to provide means for producing from received waves a cyclical variation corresponding in its time phase relation to the direction from which said waves are received together with means controlled by said time phase relation to operate in accordance with said direction.

Further objects of my invention relate to the provision of particularly efficacious means for utilizing the time phase relation of said cyclically varying response to control the orientation of the receiving system.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which

Figure 1:
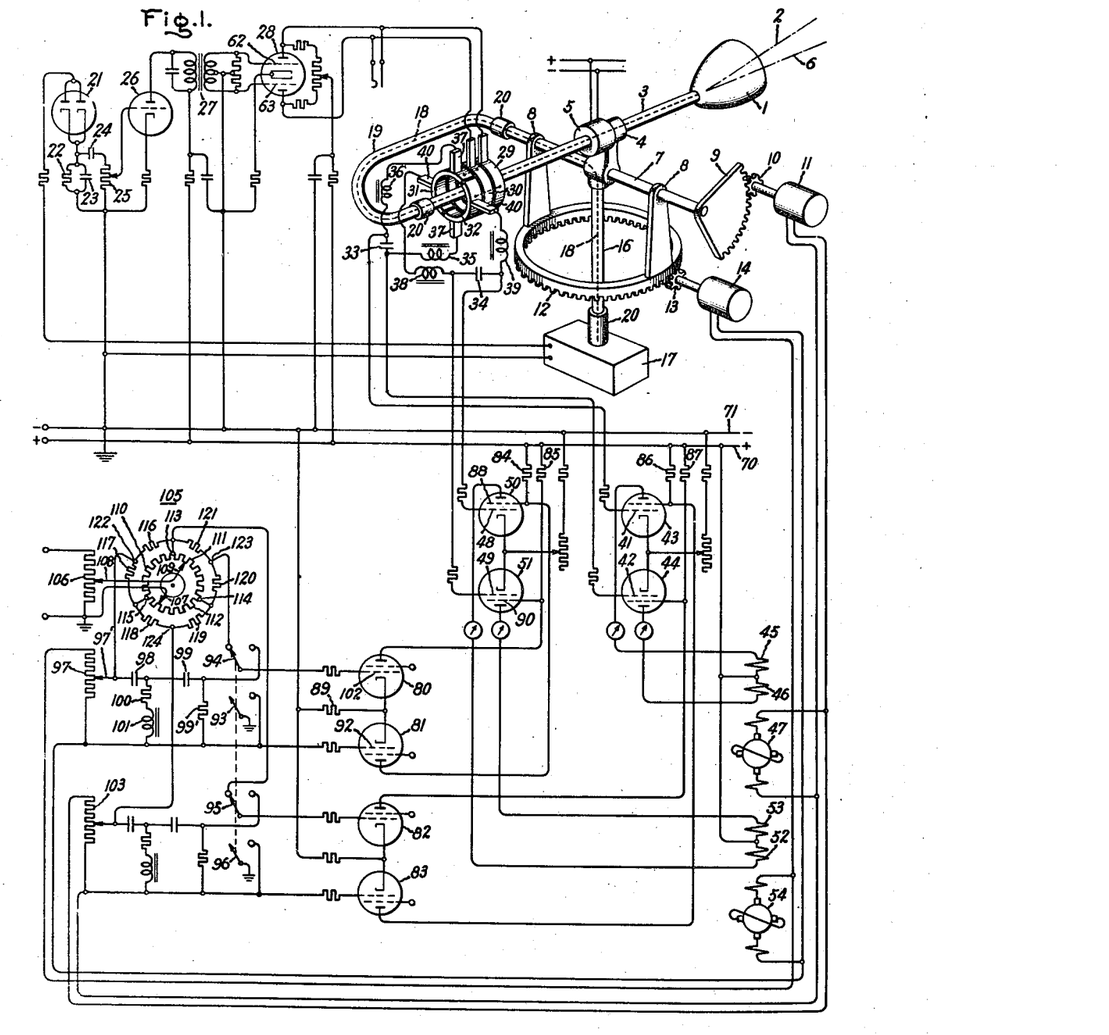
Fig. 1 represents an embodiment of my invention.

Referring to Fig. 1 of the drawings, I have shown in the upper right-hand corner thereof, in a very conventional way, a radio system which may comprise an antenna arranged within, as at the focal point of, a reflector 1. This reflector 1 may comprise any conducting surface, preferably in the form of a surface of revolution. Commonly such reflectors are of a paraboloidal form having the antenna at the focal point thereof. This antenna, together with the reflector 1 may be considered to have a directivity pattern about an axis 2, this axis being the axis of directivity of the system. The reflector 1, may suitably be mounted upon a shaft 3 arranged for rotation in a bearing 4, and such other bearings as may be required when driven by a motor 5 arranged on the shaft. The axis 6 of the shaft 3 extends at an angle of a few degrees to the axis of directivity 2 of the antenna system and accordingly the axis of directivity 2 is rotated about the axis 6 of the shaft 3, its path of revolution comprising the surface of a cone. Waves received from the direction of the axis 6 are, therefore, received with uniform intensity in all positions of the antenna system 1 in its rotation, except for such variations in intensity as may be produced by changes in the plane of polarization of the antenna. The effect produced by such variations will later be discussed. Waves received from any direction other than the direction of axis 6, however, affect the receiving antenna differently by reason of its different orientation when the system is at different points in its path and the result is a periodically varying response of the antenna to such waves. This periodically varying response has a time phase relation dependent upon the direction from which the waves are received with respect to the direction of orientation 6 and, in accordance with my invention, this time phase relation is utilized to control the orientation of the system, that is, to control the direction of the axis 6 to maintain that axis directed along the line of propagation of the received waves.

This cyclical variation in response of the system to waves received from directions other than the direction of axis 6 may be produced either by rotating the reflector, the antenna, or both as desired. In systems where the reflector is too large it is preferable to rotate only the antenna. To vary the orientation the center of symmetry of the antenna may be rotated about the focus of the reflector without rotating the antenna itself. For reasons of mechanical simplicity of the system, however, the antenna itself may also be rotated about its point of symmetry. This results in a cyclical variation in response due to changes in polarization of the antenna. This variation is not objectionable, however, since it is double the frequency of the rate of rotation of the antenna and its effect is automatically eliminated in the system presently to be discussed.

The shaft 3 is arranged for rotation about both the horizontal and the vertical axis. The bearing 4 is mounted upon a horizontal shaft 7, which is mounted for rotation in bearings 8, and which is provided with a gear sector 9, which cooperates with a gear 10 driven by a motor 11 whereby upon operation of the motor 11 the shaft 3 may be rotated in a vertical plane about the horizontal axis 7 thereby to project the axis of orientation 6 at any desired angle in the vertical plane.

The bearings 8, supporting the horizontal shaft 7, may be supported upon a horizontal ring gear 12, which cooperates with a gear 13 driven by a motor 14 whereby upon operation of the motor 14 the ring gear 12 is rotated in the horizontal plane thereby carrying the shaft 3 horizontally about a vertical axis which may be considered to comprise a shaft 16. Thus the antenna system may be directed in any direction in the horizontal plane.

The radio equipment associated with the antenna may be considered to be represented by the cube 17 shown on the drawings beneath the equipment thus far described. A transmission line extends from this equipment to the antenna of the system 1, this transmission line being represented by a dotted line 18 on the drawings, and extends through the vertical shaft 16 into the horizontal shaft 7, thence through an interconnecting member 19 to the horizontal shaft 3 through which it passes to the antenna of the system 1. These various shafts are hollow to enclose the transmission line 18. This line may comprise a central conductor, which may be considered as represented by the dotted line 18 and an outer conductor which is grounded.

Rotatable joints 20 are provided at the left end of the shaft 3 and at the left end of the shaft 7 and at the bottom of shaft 16 to permit rotation of these respective shafts about their own axes.

Radio frequency potentials induced in the antenna are supplied through the transmission line 18 to radio equipment 17 where it is amplified, converted in frequency as desired, detected, and the resulting pulses of unidirectional current are supplied to a detector 21. These unidirectional pulses may occur at a frequency of about 2000 cycles per second.

As previously described the current supplied to the detector 21, comprising these unidirectional pulses, may cyclically vary in intensity at a frequency corresponding to the frequency of rotation of the antenna system 1. Thus, if the reflector 1 be rotated at 20 revolutions per second the current supplied to the detector 21 is modulated at a 20 cycle rate. Thus a potential is produced upon the load resistance 22 and shunt condenser 23 of the detector 21 having a 20 cycle modulation. This 20 cycle modulation is supplied through a coupling condenser 24 and potentiometer 25 to the grid of an amplifier 26 where it is amplified and supplied through a transformer 27 to the control electrodes of a push-pull amplifier 28. The output potential from this push-pull amplifier 28 is supplied through a mechanical rectifier comprising slip rings 29 and 30 and commutator segments 31 and 32 to a pair of condensers 33 and 34.

This mechanical rectifier may be suitably mounted upon the shaft 3 for rotation therewith. The slip ring 29 may be considered to be connected to the commutator segment 32 and the slip ring 30 may be connected to the commutator segment 31 as indicated by dotted lines on the drawings, the two commutator segments being in the form of oppositely disposed semi-circles of a single circumference. The condenser 33 is connected through choke coils 35 and 36 between a pair of brushes 37 cooperating with the commutator segments 31 and 32, and which may be disposed, for example, in the vertical plane. Condenser 34 is connected through choke coils 38 and 39 between the brushes 40 cooperating with the commutator and which may be positioned, for example, in the horizontal plane.

In the operation of the system as thus described unidirectional potentials appear on condensers 33 and 34 having polarity and intensity dependent upon the direction from which the waves intercepted by the antenna system arrive. The potential on condenser 33 is supplied between the control electrodes 41 and 42 of a pair of electron discharge devices 43 and 44, the anode circuits of which include respective field windings 45 and 46 of a direct current generator 47, the potential of the latter of which is supplied to the motor 11, which drives the antenna system in its orientation in the vertical plane. The potential of condenser 34 is supplied between the grids 48 and 49 of a pair of electron discharge devices 50 and 51 which include in their anode circuits the respective field windings 52 and 53 of a direct current generator 54, the voltage of which is supplied to the motor 14, which drives the antenna in its orientation in the horizontal plane.

For a more detailed understanding of the operation of the system as thus far described, let us refer to Figs. 2 to 7. Frequently apparatus, in accordance with my invention, may be employed in connection with echo systems in which waves are radiated from the antenna in the form of short pulses of but a few microseconds duration, these waves being propagated in sharp beams from the antenna system and being again received upon the antenna system after they are reflected from a remote reflecting surface. Such impulses may be also utilized to operate radio equipment upon remote aircraft, for example, which, in turn, transmit other impulses which may be received in the receiving system. Thus, in such equipment, the apparatus represented by the cube 17 may be considered as both a transmitter supplying the antenna system and as a receiver responding to waves intercepted by the antenna system.

Figure 2:
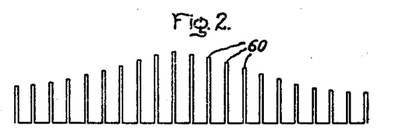
Figs. 2, 3, 4, 5, 6, 7 and 8 represent certain characteristics thereof.
Figure 3:
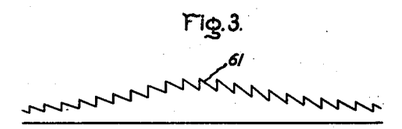

The received radio frequency pulses are supplied through transmission line 18 to the equipment 17 where they are detected to produce unidirectional current pulses such as those represented at 60 in Fig. 2. These pulses are then supplied to detector 21. The intensity of these pulses may be considered to vary in a sine wave fashion when the direction from which said waves are received does not correspond with the direction of the axis 6, this sine wave variation having a frequency equal to the rate of rotation of the system 1. This modulation of the pulses 60 is detected by the detector 21 to produce a unidirectional voltage upon the resistance 22 having a saw-tooth variation therein as indicated by the curve 61 of Fig. 3. This voltage 61 is amplified by the amplifier 26 and supplied through transformer 27 to the grids 62 and 63 of the push-pull amplifier 28 in opposite phase. The transformer may be broadly tuned to the cyclic variation which may, for example, be of a frequency of 20 cycles per second and it effectively removes the saw-tooth variation indicated in Fig. 3. The result is a sine wave of voltage existing between the anodes of the amplifier 28. This voltage may be considered as represented by the curve 64 of Fig. 4(a).

This voltage is then supplied through the mechanical rectifier, comprising the slip-rings 29 and 30, and the commutator segments 31 and 32 cooperating with two pairs of brushes 37 and 40, to the condensers 33 and 34, each of which is connected between a respective pair of said brushes.

The effect of the mechanical rectifier is to reverse the polarity of the alternating current wave supplied to each pair of brushes twice in each cycle of the wave, the reversal occurring at the brushes 37 being displaced by 90 degrees in the cycle from the reversals which occur at the brushes 40. Thus, for example, if the voltage supplied between the two slip rings 29 and 30 be represented by the curve 64 of Fig. 4(a) then the voltage appearing between one pair of brushes 37 may be considered to be of the form represented by the curve 65 of Fig. 4(b), and that appearing between the other set of brushes 40 may be considered to be of the form represented by the curve 66 of Fig. 4(c). The choke coils 35, 36, 38 and 39 are of sufficiently great inductance substantially to remove the alternating, or variation, component of the waves 65 and 66 with the result that no voltage appears upon condenser 33, since the wave 65 is symmetrical with respect to the zero axis 67. A unidirectional voltage does appear upon condenser 34, since the wave 66 is not symmetrical with respect to the zero axis, this voltage being represented by the distance between the dotted line 68 and the zero axis 69 of Fig. 4(c), this distance representing the average value of the wave 66. Thus condenser 34 assumes a charge and accordingly one of the control grids 48, or 49, of the discharge devices 50 and 51 becomes more positive than the other, with the result that one of these devices 50 and 51 passes more current in its anode circuit than the other. These anode currents flow from a source, the positive terminal of which is indicated at 70 through the two windings 52 and 53 of the generator 54 and the respective discharge devices 50 and 51 back to the negative terminal 71 of the source. The result is that a voltage is produced by the generator 54 of a certain polarity which is supplied to the motor 14, which in turn rotates the antenna system 1 in the horizontal plane to such a position that the voltage represented by the dotted lines 68 of Fig. 4(c) disappears.

Figure 4A:
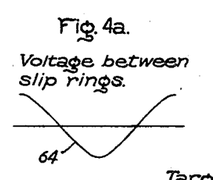
Figure 4B:
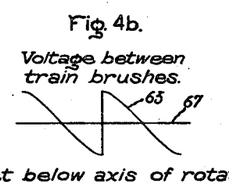
Figure 4C:
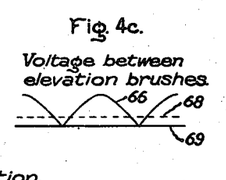

The curves of Figs. 4(a), 4(b), and 4(c) may be considered to represent conditions which exist when the wave is received with maximum intensity from a direction in the vertical plane below the axis of orientation 6, for example.

Figure 5A:
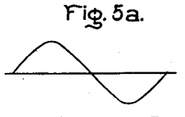
Figure 5B:
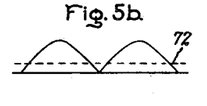
Figure 5C:
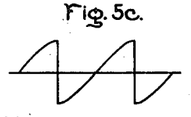

If we assume that these waves are received from a source whose direction in the horizontal plane is to the right of the axis of orientation 6 of the antenna system then the corresponding voltage relations are those represented by the curves of Figs. 5(a), 5(b) and 5(c).

Figure 6A:
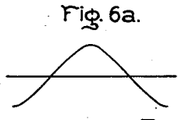
Figure 6B:
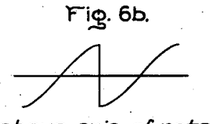
Figure 6C:
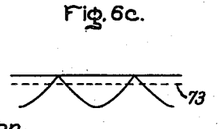
Figure 7A:
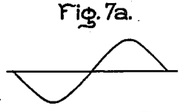
Figure 7B:
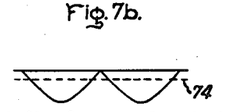
Figure 7C:
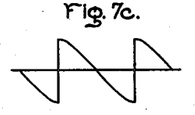

If the target be above the axis of rotation in the vertical plane then the voltage conditions represented in Figs. 6(a), 6(b) and 6(c) exists, and similarly, if the waves are received from a source whose direction in the horizontal plane is to the left of the axis of rotation, then the voltage conditions will be those represented by Figs. 7(a), 7(b) and 7(c).

It will be seen that when the wave is received from a source whose direction is to the right in the horizontal plane a voltage represented by the dotted line 72 in Fig. 5(b) appears upon the condenser 33 and no voltage appears upon condenser 34. When it is received from a source whose direction is above the axis of rotation in the vertical plane then no voltage appears upon condenser 33 but a voltage does appear upon condenser 34 as represented by the dotted line 73 in Fig. 6(c), this voltage being of opposite polarity from that indicated in Fig. 4(c) by the line 68 when the wave is received from a source whose direction is below the axis. When the wave is received from a source whose direction is to the left of the axis of rotation a unidirectional potential appears upon condenser 33 as represented by the line 74 of Fig. 7(b), this voltage being of opposite polarity to that represented by the line 72 in Fig. 5(b). No voltage appears upon the condenser 34.

It will thus be seen that the discharge devices 50 and 51 respond to the unidirectional voltage on condenser 34 to control the direct current generator 54 to cause it to produce a unidirectional potential having an intensity dependent upon the projection of the angle between the direction of the source of the received waves and the axis of orientation 6 upon the horizontal plane and having a polarity determined by the direction of this angle from that axis in the horizontal plane. This voltage causes operation of the motor 14 in such a direction as to rotate the antenna system in the horizontal plane in a direction toward the direction of the source of the received waves.

Discharge devices 43 and 44 respond in a similar way to the voltage across condenser 33 to control the generator 37 to cause it to produce voltage which when supplied to motor 11 causes it to rotate the antenna system in the vertical plane in a direction toward the direction of the source of the received waves. In this way it will be seen that the direction of orientation 6 of the antenna system may be maintained directed automatically at the source of the received waves, which may be reflecting surface such as a remote aircraft upon which waves from the same antenna system impinge and from which they are reflected.

The direct current generators 47 and 54 may of course be of any suitable type the voltage of which is controlled in intensity and polarity by field windings such as those shown at 45 and 46 and at 52 and 53, respectively. I prefer that these generators be of the type commonly known as Amplidynes.

Of course, in the operation of systems such as that here described the phenomenon of hunting is likely to occur, that is, for example, if voltage appears upon condenser 34 causing generator 54 to produce a voltage to drive the motor 14 in one direction, it may be that, due to inertia of the system and the like, the motor 14 does not stop when the voltage on condenser 34 disappears but continues and drives the antenna past the desired point, thereby producing a voltage of opposite polarity on the condenser 34. This in turn brings about a reversal of polarity of the voltage supplied by generator 54 to the motor 14, which in turn reverses the direction of rotation of the antenna, which may, again, move too far, this hunting operation about the desired point continuing indefinitely. To counteract this effect the voltage from the generator 54 is utilized through discharge devices 80 and 81 to modulate the screen grid potentials of the discharge devices 50 and 51 thereby to change the conductivity of these devices in a direction opposite the change produced by the potential on condenser 34. Similarly the voltage of the generator 47 is utilized through discharge devices 82 and 83 to modulate the screen grid potentials of devices 43 and 44.

Each of the screen grids of discharge devices 50 and 51, 43 and 44 have potentials supplied thereto from the positive terminal 70 of the source through respective resistances 84, 85, 86 and 87. The voltage on resistance 84 is controlled by the current flowing between the anode and cathode of a discharge device 81, the anode of this device being connected to the screen grid 88 of the device 50 and the cathode thereof being connected through a resistance 89 to the negative terminal 71 of the source of supply. In the same way the screen grid potential on the screen grid 90 of device 51 is controlled by the current flowing in the anode circuit of the discharge device 80. The control grid 92 of the device 81 may be considered to be grounded by the moving contact 93 of a switch having four armatures 93, 94, 95 and 96 and which are normally in the right-hand position of the two positions shown on the drawings. The voltage generated by the generator 54 is supplied across a potentiometer 97 a portion of which is supplied between the control grids of the devices 80 and 81, that is, between ground and the control grid 102 of the device 80. This circuit comprises the coupling condensers 98 and 99 and the armature 94 of the switch in its right-hand position. The condensers 98 and 99 are series condensers of an anti-hunt filter having a shunt branch comprising a resistance 100 and an inductance 101. The purpose of this filter will later be generally indicated but it is more particularly described and claimed in my copending application Serial No. 445,949 filed June 5, 1942, entitled Follow-up control system, and which is assigned to the same assignee as my present application.

Discharge devices 82 and 83 are associated with the voltage generator 47 and the discharge devices 43 and 44 in the same way that has been described in connection with the discharge devices 80 and 81.

For a more detailed description of the operation of these devices, let us assume the potential on condenser 34 is such that control grid 49 of device 51 is positive with respect to control grid 48 of device 50 and that the voltage of the generator 54 is of such polarity that the grid 102 of discharge device 80 is positive with respect to ground. Current increases in this device 80, this current flowing through resistances 85 and 89. The increase in current in resistance 85 reduces the potential applied between the screen grid and cathode of the device 51 thereby reducing the current flowing in the anode of that device. The potential on the resistance 89 tends to reduce the anode current in the device 81 which in turn increases the potential on the screen grid 88 of the device 50. These two effects thus both tend to restore the normal zero voltage of generator 54. Had the voltage of generator 54 been of the opposite polarity the opposite change of voltage would have occurred on the resistances 84 and 85, the change in voltage on resistances 84 and 85 always being in the proper direction to tend to reduce the voltage of the generator 54 and thus to reduce the tendency to hunt.

The anti-hunt circuit comprising the elements 98, 99, 100 and 101 is designed to operate as a high pass filter, having output as low as possible below a frequency $f(a)$ which is the highest frequency of any component of motion of the reflecting surface from which impulses are received, and the motion of which the orientation of the antenna system is to follow, and having maximum output in proper phase to produce maximum anti-hunting effect in the vicinity of, or at a frequency higher than, the frequency $f(b)$ the frequency at which hunting tends to occur.

The elements of the filter may have the following values:

Capacity $C_{98}$ of condenser 98 may be $$C_{98} = \frac{300{,}000}{Lf(b)^2}$$

Capacity $C_{99}$ of condenser 99 may be $$C_{99} = \frac{2000\sqrt{LC_{98}}}{R}$$

where R is the resistance of resistor 99' in ohms, L is the inductance of coil 101 in henries, and $C_{98}$ and $C_{99}$ are expressed in microfarads, and $f(b)$ is expressed in cycles per second. The value L of inductance 101 may be arbitrarily chosen and the resistance of resistor 100 may best be determined empirically after the values L, $C_{98}$ and $C_{99}$ have been determined. The resistance of resistor 99' should be as high as possible.

It may be desired manually to control the orientation of the antenna system 1. For this purpose armatures 94 and 95 of the switch 93, 94, 95 and 96 are provided with alternate positions in which the circuits of the respective discharge devices 80 and 82 are disconnected from the anti-hunt circuit and connected to a bridge arrangement 105 from which voltage may be supplied to control manually the orientation of the system. This manual control device 105 comprises a potentiometer 106, which may be connected across a source of unidirectional potential. The grounded terminal of this potentiometer is connected to a variable contact 107 on a circular bridge resistance comprising segments 110, 111, 112, and the variable contact 108 of potentiometer 106 is connected to a second variable contact 109 on the circular bridge resistance 110, 111, 112. The latter two contacts 107 and 109 are arranged for rotation in unison about the circular potentiometer comprising the three equal resistors 110, 111 and 112. These contacts 107 and 109 are positioned diametrically opposite each other on the circular resistances 110, 111 and 112 so that equal currents flow between these contacts through opposite portions of this circular resistance.

Three points 113, 114 and 115 between the equal segments 110, 111, 112, of this circular potentiometer, are connected to respective points on a chain of resistances comprising resistors 116, 117, 118, 119, 120 and 121 all connected in series in that order. The resistances 116 and 121 may be equal, resistances 117 and 120 may be equal, and 118 and 119 may be equal. The discharge devices 82 and 83 which control the operation of the antenna in the vertical plane have their control grids connected for direct current respectively between the top and bottom points, that is, points 113 and 120 of the manual control device. The discharge devices 80 and 81 which control the operation of the system in the horizontal plane have their grids connected between points 122 and 123 symmetrically disposed with respect to these two points 113 and 124.

Let us suppose that movable contacts 107 and 109 are positioned vertically in the device. Then a potential exists between points 113 and 124, which potential is of polarity such that when supplied between the control grids of discharge devices 82 and 83 to control the potential of the screen grids of devices 43 and 44 it causes the generator 47 to supply voltage to drive the antenna system in a certain direction in the vertical plane. The speed at which it is driven is controlled by variation of the position of contact 108 on the resistance 106. At this time no voltage exists between points 122 and 123 and accordingly no voltage exists between the grids 92 and 102 of discharge devices 80 and 81 and the horizontal motor 14 is therefore not energized.

Now let us suppose that the contacts 107 and 109 are both rotated in a clockwise direction through a quarter of its rotation; then no voltage exists between points 124 and 113 and the vertical driving motor 11 is deenergized. Voltage does exist between points 122 and 123 and hence between the control grids of devices 80 and 81, which in turn operate through discharge devices 50 and 51 to cause the horizontal motor 14 to drive the antenna in the horizontal plane.

If contacts 107 and 109 be positioned at any other angle then both motors 11 and 14 are energized and operate to drive the antenna system at an angle both to the horizontal and the vertical. The speed at which the antenna system is driven is, of course, always controlled by the position of contact 108 on variable resistance 106.

It will be observed that voltage supplied from the manual control device 105 between the grids 102 and 92 of amplifiers 80 and 81 is supplied in series with voltage from potentiometer 97 produced by generator 54. Similarly, voltage supplied between control grids of devices 82 and 83 from device 105 is supplied in series with voltage from potentiometer 103. The action of the system is to maintain the sum of these two voltages substantially zero, i. e. the voltage from device 105 and the voltage from the respective potentiometer. The feed back from the generator through the respective potentiometer to the input of the discharge devices is desirable to minimize any effect of residual magnetism in the respective generator, or unbalance in the circuit.

If, during the time when the antenna system is being oriented in response to manual adjustment of contacts 107 and 109 of device 105, a signal is received, as by reason of reflection from a remote surface such as an aircraft, the signal immediately seizes control of the apparatus and the orientation of the system follows the movement of the craft notwithstanding any potentials supplied from device 105. This is true if the orientation of the system agrees, within a few degrees, with the direction from which the received signal arrives.

Figure 8:
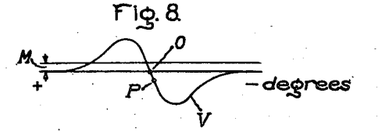

The reason for this action of the device may better be understood from a consideration of Fig. 8. In Fig. 8 the curve V indicates the voltage of either of the generators 47 and 54 as the orientation of the antenna system is varied through the direction from which received waves arrived. This curve is plotted with the magnitude of voltage as ordinates and angle between the direction of orientation of the system and the direction of received waves as abscissa.

Let us assume that the system is oriented far to the left of the direction of the received signal. The voltage of the generator is then zero as indicated by the left end of the curve. As this orientation approaches the direction of the arriving signal the voltage of the generator first rises and then falls in accordance with the curve V until it becomes zero when the orientation of the system agrees with the direction from which the received signals arrive. Upon further movement of the system the voltage again increases and decreases until it becomes zero when the signal is no longer received.

This same effect occurs if a steady voltage be produced by the generator in response to a steady voltage supplied from the manual control device 105, so long as this steady voltage, the value of which may be represented at M on Fig. 8, is less than the maximum value of the voltage of the generator produced in response to the received signal, i. e. so long as the value M is less than the peak value of the curve V. The only difference is that equilibrium of the system occurs at the point P on curve V rather than at the zero point of the horizontal axis, the point P being the point where the value of voltage of curve V is equal and opposite to the value M. Since point P is displaced along the horizontal axis from the zero point, an error is present in the orientation of the system when equilibrium occurs. This error, however, is small and disappears when the operator throws his switch 93, 94, 95, 96 to the right-hand position. That is, the operator uses the device 105 to scan remote space until a remote source of received waves is found. The system then automatically orientates itself upon that source notwithstanding any manipulation of device 105. The operator then throws his switch 93 to 96 to the right for accurate orientation on that source.

Figure 9:
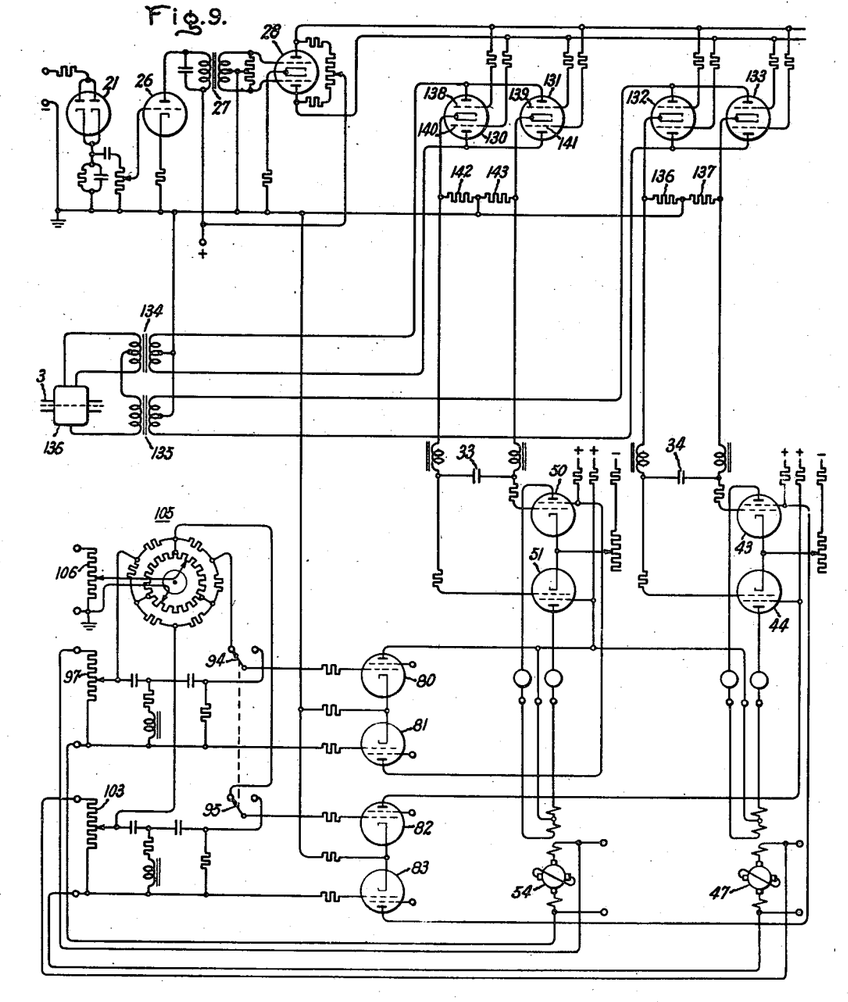
Fig. 9 represents a modification of my invention.

Fig. 9 represents a modification of my invention in which the mechanical rectifier comprising the slip rings and commutator of Fig. 1 are replaced by electron discharge devices 130, 131, 132 and 133 the anode circuits of which are supplied from respective output windings of Scott connected transformers 134 and 135, the primary windings of which are energized in quadrature phase relation from a three-phase generator 136 mounted upon the shaft 3 of the radio system as in Fig. 1 and which has a frequency equal to the rate of rotation of the antenna system. The detector 21 and amplifiers 26 and 28 operate exactly as has been described in connection with Fig. 1 as do also the discharge devices 50, 51, 43, 44 and 80 to 83.

Each of the discharge devices 130, 131, 132 and 133 comprises two triodes the grids of which are connected to opposite sides of the balanced output circuit of the amplifier 28. The cathodes of the discharge device 130 are connected together and through a resistance 142 to ground. The cathodes of device 131 are connected together and through a resistance 143 to ground. The cathodes of device 132 are connected together and through a resistance 136 to ground and the cathodes of device 133 are connected together and through a resistance 137 to ground. The anodes of the device 130 are connected to opposite sides of the secondary winding of the transformer 134 as are also the anodes of devices 131. Similarly the anodes of device 132 are connected to the opposite sides of the secondary windings with transformer 135 as are also the anodes of the device 133.

It will be seen that the anodes of the two triodes in each of discharge devices 130 and 131 are alternately conducting at the same frequency as the modulation supplied through amplifier 26. Likewise the opposite triodes in the two devices 132 and 133 are alternately conducting at the same frequency but in a time phase relation displaced by 90 degrees from the periods of conductivity of the devices 130 and 131.

Thus, for example, let us suppose that a sine wave of voltage of the 20 cycle frequency appears across the balanced output circuit of amplifier 28 and that this voltage is in phase with anode voltage on the upper anodes of the discharge devices 130, 131. The potential on the grid 138 of amplifier 130 tends to cause the current in the anode circuit and in resistance 142 to increase. The voltage which is supplied from output circuit of amplifier 28 to the grid 139 is of the opposite phase and tends to cause the current in the anode associated with grid 139 to reduce thereby reducing the current in resistance 143. The opposite grids 140 and 141 have no effect since the anodes of these devices are negative with respect to the cathode during this portion of the cycle. The result is that the cathode of device 130 becomes positive with respect to the cathode of the device 131 and this potential appears across condenser 33. This potential exists during the next half cycle and is caused by an increase of current in resistance 142 caused by a positive voltage on grid 140 and a decrease in current in resistance 143 caused by a negative voltage on grid 141.

The anodes of devices 132 and 133, however, are energized in 90 degree phase relation with respect to the devices 130 and 131 with the result that under the assumed conditions no voltage exists between the cathodes or upon condenser 34. If the time phase relation, however, of the voltage supplied by amplifier 28 shifts by 90 degrees, as would be the case if the direction of propagation of the received waves were rotated through 90 degrees about the axis of orientation of the antenna system, then the same situation would exist in devices 132 and 133 as has been described in connection with devices 130 and 131 and a voltage appears upon condenser 34.

The polarity of the voltage upon condensers 33 and 34 depends upon the phase relation between the voltage supplied from the balanced amplifier 28 and the anode voltage of the respective discharge devices and may be either positive or negative. Thus these devices operate as rectifiers to produce the unidirectional voltages varying exactly as has been described in connection with Fig. 1.

The remaining portion of Fig. 9 is the same as has been described in connection with Fig. 1 and requires no further description. Either the mechanical rectifier of Fig. 1 or the electron discharge rectifier of Fig. 9 has the advantage that the voltages produced on the condensers 33 and 34 are not affected by any even harmonics of the fundamental 20 cycle wave at the output of amplifier 28. This is desirable because the rotation of the antenna of the system 1 and the cyclical variation of its plane of polarization at twice the rate of rotation of the system 1 produces such even harmonics to some appreciable extent. The rectifiers described, however, prevent their having any effect upon the operation of the system.

While I have shown particular forms of my invention, it will, of course, be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In combination, a directive radio system, means to rotate said system about an axis extending at an acute angle to the axis of directivity of said system thereby to rotate said axis of directivity about said first axis, whereby waves received from a direction other than the direction of said first axis produce cyclically varying response in said system, a plurality of energy storage devices, a plurality of pairs of discharge devices, each storage device being connected between the cathodes of one of said pairs, means to supply alternating operating potential having the frequency of said cyclical variation to the anodes of each pair in phase, the operating potential supplied to one pair being displaced by a predetermined angle from that supplied to another pair, means including said pairs of discharge devices to supply current varying as said cyclically varying response to each of said energy storage devices and to reverse the polarity of current supplied to each energy storage device at twice the frequency of said cyclical variation, the reversal of current supplied to one energy storage device being displaced by said predetermined angle from the reversals of the current supplied to the other device, and means responsive to potential developed in said storage devices to control the orientation of said first axis to maintain said potentials nil.

2. In a directive radio system, means to rotate the axis of directivity of said system about an axis of rotation extending at an acute angle thereto, thereby to produce in said system a cyclically varying response to waves received from directions other than the direction of said axis of rotation, said cyclically varying response having a time phase relation dependent upon the direction of propagation of the received waves, electron discharge means responsive to said cyclically varying response to produce a plurality of unidirectional electromotive forces, each electromotive force corresponding to a plane through said axis of rotation, and each having intensity and polarity dependent upon the projection of said direction of propagation upon a respective plane extending through said axis of rotation, and means responsive to said electromotive forces to orient said axis of rotation in the direction of said propagation.

3. In a directive radio system, means to rotate the axis of directivity of said system about an axis of rotation extending at an acute angle thereto, thereby to produce in said system a cyclically varying response to waves received from directions other than the direction of said axis of rotation, means responsive to said cyclically varying response to orient said axis of rotation in a plurality of planes, said means comprising a pair of electron discharge devices corresponding to each plane, means to render said devices periodically conducting synchronously with said cyclic variation, the devices in each pair being conducting simultaneously and during periods displaced in time phase relation with respect to the periods of conductivity of the devices of another pair, means to vary oppositely the conductivity of the devices of each pair to an extent dependent upon the intensity of said cyclic variation while the respective devices are conducting, and means responsive to the difference in the conductivity of the devices in each pair to control the orientation of said axis of rotation in the respective plane.

4. In combination, a directive radio system, means responsive to waves received in said system to control the orientation thereof, said means comprising a motor, means to supply voltage to said motor, and electron discharge means to control the polarity and intensity of said voltage, said electron discharge means comprising a pair of electron discharge devices, each of said devices having an anode, a cathode, a control electrode, and a second control electrode, means to vary the voltage on said first control electrodes differentially in response to the direction from which waves are received in said system, means to control said voltage supplied to said motor in response to current in said anodes, and means responsive to said voltage supplied to said motor to vary the potential on said second control electrodes to counteract the effect produced by said voltage supplied to said first control electrodes.

5. In combination, a directive radio system, means responsive to waves received in said system to control the orientation thereof in different planes, said means comprising a plurality of motors, means responsive to the direction of propagation of received waves to supply voltage to said motors of such intensity and polarity as to cause said motors to orient said system in said direction, and a single manual control member arranged for rotation, and means responsive to the position of said member in its rotation to vary the orientation of said system in any plane.

6. In combination, means to be oriented in different planes, a plurality of motors, each motor being arranged to orient said device in a corresponding one of said planes, a control device for said motors comprising a circular potentiometer having oppositely disposed contacts movable in unison about said circular potentiometer, a source of electromotive force connected between said contacts, an impedance loop having symmetrically spaced points connected to corresponding points spaced about said circular potentiometer, and means to control each of said motors in response to voltage between a respective pair of oppositely spaced points about said impedance loop, said points of one pair being displaced around the loop from the points of another pair.

7. In combination, a directive radio system, means responsive to waves received in said system to control the orientation thereof, said means comprising a motor, means to supply voltage to said motor, and electron discharge means to control the polarity and intensity of said voltage, said electron discharge means comprising an electron discharge device having an anode, a cathode, and a pair of control electrodes, means to vary the voltage on one of said control electrodes in response to the direction from which waves are received in said system, means to control the voltage supplied to said motor in response to current in said discharge device, and means responsive to said voltage supplied to said motor to vary the potential on a second of said pair of control electrodes to counteract the effect produced by said voltage supplied to said first of said pair of control electrodes.

8. In combination, a radio system having maximum effect with respect to a particular direction, and having an axis of orientation extending at a small angle to said direction means to produce from waves received in said system an electromotive force varying in intensity and polarity with variations of said axis from the direction of propagation of said received waves, means responsive to said voltage to maintain said axis parallel with said direction of propagation in a particular plane, said means including a dynamo electric machine having a pair of windings, a pair of electron discharge devices, each having an anode circuit including a corresponding one of said windings, means to supply said electromotive force to said pair of discharge devices to produce oppositely varying effects in said anode circuits, and means responsive to the effect produced by said last means on said dynamo electric machine to vary said axis of orientation toward the direction from which said received waves arrive, and additional means responsive to said effect produced on said dynamo-electric machine to produce a counteracting effect on said discharge devices.

9. In combination, a directive receiving system having an axis of orientation and having maximum sensitivity to waves received along a directive axis extending at a small angle to said axis of orientation, means to rotate said directive axis about said axis of orientation whereby waves received from a direction at an angle to said axis of orientation are received with cyclically varying intensity in said antenna, electron discharge means to separate said cyclical variation into two components corresponding to respective planes at right angles to each other, and means responsive to each of said components to operate in accord with the direction from which said waves are received in the respective planes.

10. In combination, a directive receiving system having an axis of orientation and having maximum sensitivity to waves received from a directive axis at a small angle to said axis of orientation, means to rotate said directive axis about said axis of orientation whereby waves received from a direction at an angle to said axis of orientation are received with cyclically varying intensity in said antenna, said cyclical variations in intensity having a time phase relation corresponding to the direction from which said waves are received relative to said axis of orientation, electron discharge means to produce a unidirectional electromotive force having polarity and intensity corresponding to the projection of said direction on a desired plane parallel to said axis of orientation, and means controlled by said unidirectional electromotive force to produce an effect when said electromotive force has one polarity and an opposite effect when said electromotive force has the opposite polarity, said effects varying with the magnitude of said unidirectional electromotive force.

11. In combination, a directive receiving system having an axis of orientation and having maximum sensitivity to waves received from a directive axis at a small angle to said axis of orientation, means to rotate said directive axis about said axis of orientation whereby waves received from a direction at an angle to said axis of orientation are received with cyclically varying intensity in said antenna, said cyclical variations in intensity having a time phase relation corresponding to the direction from which said waves are received relative to said axis of orientation, means to detect said received waves to produce alternating electromotive force having frequency and phase corresponding to said cyclical variations, means to produce from said alternating electromotive force a plurality of voltages each having variations corresponding to the projection of said direction on a corresponding plane radiating from said axis of orientation, and means controlled jointly by said voltages to produce an effect varying in accord with the direction of said projections on said planes.

12. In combination, a radio antenna having an axis of orientation and having maximum sensitivity to waves received from a direction at an angle to said axis, means to rotate said direction about said axis, means to detect the waves received in said antenna, whereby alternating electromotive force is produced having time phase relation dependent upon the direction from which said waves are received, a commutator having a commutator segment and slip ring and having oppositely disposed brushes alternately engaged by said segment, means to rotate said commutator segment and slip ring synchronously with rotation of said direction of maximum effect, a capacitance connected between said brushes, and means to supply voltage varying in accord with said alternating electromotive force through said commutator to said capacitance, whereby a voltage is developed on said capacitance of magnitude and polarity corresponding to the projection of the direction from which said waves are received on a plane corresponding to the plane of said brushes.

13. In combination, an antenna having maximum sensitivity to waves received from a particular direction, means to rotate said direction about the surface of a cone, means to detect the received waves, whereby electromotive force is produced varying cyclically in response to waves received from directions at an angle to the axis of said cone, a commutator having oppositely disposed brushes, a capacitance, means to supply said electromotive force through said commutator and brushes to said capacitance, means to rotate said commutator synchronously with said direction, whereby said capacitance assumes a charge having polarity dependent upon the direction from which waves are received in a predetermined plane corresponding to the plane of said brushes.

14. In combination, a directive receiving system having an axis of orientation and having maximum sensitivity to waves received from a directive axis at a small angle to said axis of orientation, means to rotate said directive axis about said axis of orientation whereby waves received from a direction at an angle to said axis of orientation are received with cyclically varying intensity in said antenna, said cyclical variations in intensity having a time phase relation corresponding to the direction from which said waves are received relative to said axis of orientation, two pairs of electron discharge devices, each having an anode, a cathode, and a control electrode, a resistance connected between the cathodes of one pair and the cathodes of the other pair, means to supply alternating operating potential having the frequency of said cyclical variations between an intermediate point on said resistance and said anodes, said voltage being supplied in opposite phase to the anodes of each pair, means to supply voltage having said cyclical variations between the control electrodes of each pair, said last voltage being supplied between the control electrodes of one pair in opposite phase to that supplied between the control electrodes of the opposite pair, and means controlled by the voltage across said resistance to produce different effects in accord with the polarity of said last voltage.

SIDNEY GODET.